United States Patent Office 3,288,751
Patented Nov. 29, 1966

3,288,751
TELOMERS CONTAINING EPOXY GROUPS
Daniel Porret, Basel, Gustav H. Ott, Arlesheim, and René Huwyler, Birsfelden, Switzerland, assignors to Ciba Limited, Basel, Switzerland, a Swiss company
No Drawing. Filed Sept. 22, 1961, Ser. No. 139,865
Claims priority, application Switzerland, Sept. 26, 1960, 10,860/60
7 Claims. (Cl. 260—47)

Telomerization is a known reaction in which an ethylenically unsaturated monomer (the so-called "taxogen" or "compound A") is reacted with a so-called telogen of the formula YZ, to yield a telomer which is saturated at its ends with previously determined atoms or atomic groups of the telogen Y and Z.

It has now been found that new telomers that possess extremely valuable technical properties are formed when an ethylenically unsaturated compound which further contains a glycidyl ether group or glycidyl ester group or a group which on epoxidation yields a glycidyl ether group or glycidyl ester group and, if desired, other monomers, is reacted with a telogen under conditions that lead to an average telomerization degree not exceeding 20.

Accordingly, the present invention provides new telomers containing epoxide groups, corresponding to the formula

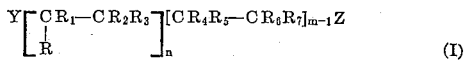

(I)

where Y and Z represent the atoms or atomic groups resulting from the cleavage of a telogen YZ (where Z, in general, represents a hydrogen or halogen atom and Y represents a lower organic radical), in which formula $R_1$ to $R_7$ each represents a hydrogen or halogen atom or an organic substituent, where R is an organic radical containing at least one group of the formula

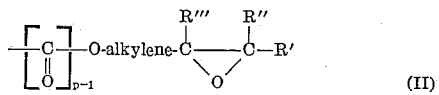

(II)

in which R' represents a hydrogen atom or an aliphatic, cycloaliphatic, araliphatic or aromatic hydrocarbon radical; R'' and R''' each represents a hydrogen atom or methyl group; "alkylene" represents an alkylene radical; $p=1$ or 2; and $n$ and $m$ each is a small number, being at least 1, the sum $[n+(m-1)]$ being at least 1 and at most 20, preferably at least 2 and at most 10, and in which the order of disposition of the individual structural units

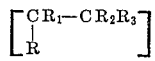

and $$[CR_4R_5-CR_6R_7]$$

within the chain may be as desired. When in the above Formula I one or several of the radicals $R_1$ to $R_7$ are organic substituents, they may of course also contain epoxide groups.

According to the invention the new telomers are obtained by reacting 1 molecular proportion of a telogen of the formula YZ with $n$ molecular proportions of a monomer of the formula

(III)

and, if desired, also with $(m-1)$ molecular proportions of a monomer of the formula $$CR_4R_5=CR_6R_7 \quad \text{(IV)}$$

where the radicals $R_1$ to $R_7$ have the above meanings and $R_a$ represents an organic radical which contains at least one group of the formula

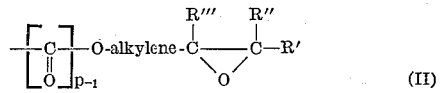

(II)

where R' represents a hydrogen atom or an aliphatic, cycloaliphatic, araliphatic or aromatic hydrocarbon radical; R'' and R''' each represents a hydrogen atom or a methyl group; "alkylene" represents an alkylene radical and $p=1$ or 2; or contains a group that can be epoxidized to the group of the Formula II, the reaction being preferably carried out in the presence of a catalyst capable of furnishing free radicals, and the resulting telomer—provided it still contains epoxidizable groups— is treated in a second stage with an epoxidizing agent.

The monomers or taxogens of the Formula III contain at least one group (II), more especially a glycidyl ether group or glycidyl ester group or a group that can be epoxidized to form such a group (II).

Typical taxogens (III) containing such a group (II) are, for example: allyl glycidyl ether, allyl-(2:3-epoxycrotyl) - ether, allyl-(9:10-epoxyoleyl)-ether, allyl - glycidyl formal, bisphenol-A-allylglycidyl ether, allyl-(2:3-epoxy-cinnamyl)-ether, ortho-allyl-phenolglycidyl ether; acrylic acid glycidyl ester, methacrylic acid glycidyl ester, glycidyl crotonate, maleic acid allyl-glycidyl ester and phthalic acid allyl-glycidyl ester.

The term "group that can be epoxidized to the group of the Formula II" refers in the first place to groups of the formula

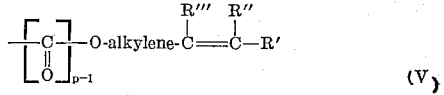

(V)

more especially allyl ether or allyl ester groups; these groups can be epoxidized to form the glycidyl group by treatment with an epoxidizing agent, for example with organic peracids such as perbenzoic acid, peracetic acid, hydrogen peroxide+formic acid or the like.

The term defined above further refers to groups of the formula

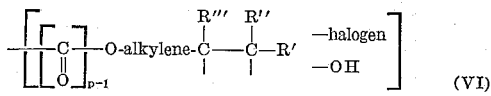

(VI)

more especially glycerol monohalohydrin ether or ester groups. As is known, such halohydrin groups can likewise be converted into epoxide groups by treatment with a dehydrohalogenating agent, such as an alkali.

In view of what has been said above concerning the meaning of the term "radical containing an epoxidizable group" the treatment, according to the invention, with an epoxidizing agent includes also the action of an agent capable of giving off a hydrogen halide, such as potassium hydroxide or sodium hydroxide, upon a halohydrin group, for example the glycerol monochlorohydrin group, with formation of the corresponding 1:2-epoxide group or of a glycidyl group.

Typical taxogens (III) containing such groups (V) or (VI) are, for example: diallyl ether, allyl-crotyl ether, allyl-methallyl ether, allyl-oleyl ether, diallyl formal, diallyl phthalate, allyl-cinnamyl ether and allyl-3-chloro-2-hydroxy-1-propyl ether.

When in the Formula I $m=1$, the product concerned is a homotelomer obtained by homotelomerization of a taxogen (III). On the other hand, when $m$ in the Formula I is a whole number greater than 1, cotelomers of taxogen (III) with taxogens (IV) are concerned. Since the conditions of the homotelomerization and of the cotelomerization are substantially identical, the term "telomerization" as used in this context refers to both kinds of the reaction.

Cotaxogens (IV) which, if desired, may be cotelomerized with the taxogens (III) which contain epoxide groups or can be epoxidized are those which contain a carbon-to-carbon double bond, more especially an $H_2C=C<$ group; there may be mentioned polymerizable olefines such as ethylene, propylene, butene, isobutylene, amylene, hexylene and butadiene; halogenated olefines such as vinyl fluoride, fluoroprene, vinylidene fluoride, difluoroethylene, trifluoroethylene, tetrafluoroethylene, difluoro-monochloroethylene, dichloro-monofluoroethylene, trifluoro-chloroethylene, difluoro-dichloroethylene, perfluoropropene, perfluorobutene; vinyl chloride, vinylidene chloride, trichloroethylene, chloroprene, tetrachloroethylene, perchloropropene; vinyl ethers such as vinyl-methyl ether, vinyl-ethyl ether or vinyl-phenyl ether; vinyl-aryl compounds such as styrene, α-methylstyrene and other substituted styrenes; furthermore compounds of the acrylic acid series such as esters of acrylic or methacrylic acid with alcohols or phenols, for example ethylacrylate, butylacrylate, dodecylacrylate, methylmethacrylate, acrylonitrile, methacrylonitrile; furthermore analogous derivatives of α-fluoracrylic acid, α-chloracrylic acid, crotonic acid, maleic acid or fumaric acid; furthermore cotaxogens that contain epoxide groups, such as monoepoxybutadiene or monepoxydivinylbenzene.

It is, of course, also possible to cotelomerize different taxogens (III) containing epoxide groups; furthermore it is, of course also possible to prepare ternary, quaternary or even higher cotelomers by cotelomerizing 3 or more different taxogens (III) or (IV).

Suitable telogens YZ are those types of compounds which are conventionally used for this purpose, for example: halogen-hydrocarbons such as carbon tetrachloride, carbon tetrabromide, chloroform, chloro-iodo methane, methylene chloride, methylene iodide, methyl iodide, monobromo-monochloro-difluoromethane, dibromo-difluoromethane, bromo-dichloromethane, iodotrifluoromethane, acetylene tetrachloride, perchloroethane, trichloroethylene, hexachloro-cyclohexane, benzotrichloride; halogenated esters, such as mono- and dichloroacetic acid methyl ester, diethyl-bromomalonate; trichloroacetyl chloride; haloalkylnitriles such as trichloroacetonitrile, α-chloronitroalkanes, alkylbenzenes such as isopropylbenzene; aldehydes such as formaldehyde, acetaldehyde, benzaldehyde, Δ-tetrahydrobenzaldehyde; ketones such as mesityl oxide and more especially cyclohexanone; acetals such as dimethyl formal, dioxolan; carboxylic acids and esters and anhydrides thereof, such as acetic acid, isobutyric acid, methyl formate, ethyl formate; alcohols such as methanol, ethanol, isopropanol, lauryl alcohol; sulfur-containing compounds such as hydrogen sulfide, mercaptans, thiophenols, sodium bisulfite; aromatic sulfonylchlorides; phosphorus compounds such as, primarily, dialkylphosphites and dialkylphosphonates; silicon compounds such as silicon tetrachloride, trichlorosilane, silane, alkylsilanes; inorganic halogen compounds such as molecular chlorine, molecular iodine, cyanogen chloride, and hydrohalic acids such as hydrochloric acid.

The telomerization according to the invention can be performed in known manner in the presence of one of the conventional telomerization catalysts, for example at a temperature ranging from 0° to 200° C., advantageously at an elevated temperature ranging from 50 to 150° C., and under a pressure ensuring that the reactants remain liquid. The process can be performed continuously or discontinuously. Since, as the proportion of telogen present in the reaction mixture rises, the degree of telomerization and/or the average molecular weight of the telomer in general drops, it is in most cases advantageous to work with an excess of telogen. If desired, the reaction may be performed in the presence of an inert solvent or diluent, such as benzene, octane or hexadecane. If desired, the individual telomer fractions can be isolated by the usual methods, such as distillation or solvent extraction.

Preferred telomerization catalysts are the conventional catalysts forming free radicals; there may be mentioned: hydrazine derivatives, for example hydrazine hydrochloride; organo-metal compounds such as lead tetraethyl, and more especially aliphatic azo compounds such as α:α'-azoisobutyrodinitrile and organic peroxides or per-salts such, for example, as peracetic acid, acetyl peroxide, chloroacetyl peroxide, trichloroacetyl peroxide, benzoyl peroxide, chlorobenzoyl peroxide, benzoylacetyl peroxide, propionyl peroxide, fluorochloropropionyl peroxide, lauryl peroxide, cumene hydroperoxide, tertiary butylhydroperoxide, di-tertiary butyl peroxide, di-tertiary amyl peroxide, paramethane hydroperoxide; furthermore inorganic peroxide compounds such as hydrogen peroxide, sodium peroxide, alkali metal percarbonates, persulfates and perborates. The amount of catalyst to be used depends in known manner on the course the reaction is desired to take or on the properties the telomer is desired to have. It is of advantage to add about 0.05 to 10 percent by weight of catalyst, calculated on the total weight of the monomer(s) or taxogens, and it is of advantage to add part of the catalyst portionwise during the telomerization reaction at the same rate as it is being consumed.

In certain cases it is also possible to use cationic or anionic catalysts. Among the former there may be mentioned Lewis acids such as hydrogen ions, $BF_3$, $SnCl_4$, $SbCl_5$ and $AlCl_3$, also metal salts such as the halides of beryllium, calcium, magnesium, strontium barium, iron, zinc, tin or titanium.

Suitable anionic catalysts are Lewis bases, for example metal alkyls or strong bases, such as sodium hydroxide. Telomerization can also be brought about by means of actinic rays, even without addition of a catalyst.

The telomerizates of the invention contain either epoxide groups or epoxidizable groups, such as an epoxidizable carbon-to-carbon double bond or a halohydrin group.

The telomerizates of the latter kind can likewise be converted by the present process into corresponding telomerizates containing epoxide groups by treatment with an epoxidizing agent.

The epoxidation of the allyl groups is carried out by a conventional method, preferably with the aid of an organic per-acid such as peracetic, perbenzoic, peradipic or monoperphthalic acid, or with a mixture of hydrogen peroxide with an organic acid, such as formic acid, or similar means. Furthermore, there may be used as epoxidizing agent hypochlorous acid, and in this case in a first stage hypochlorous acid is added on to the double bond, whereupon in a second stage the epoxide group is formed by treatment with an agent splitting off hydrochloric acid, for example with a strong alkali.

The conversion of the glycerol mono-halohydrin groups into glycidyl groups is likewise performed in known manner by treatment with an agent capable of splitting off a hydrohalic acid, such as potassium hydroxide or sodium hydroxide.

The new homotelomerizates and cotelomerizates containing glycidyl groups react with the conventional curing agents for epoxy compounds; they can, therefore, be cross-linked or cured by the addition of such curing agents, like other polyfunctional epoxy compounds or epoxy resins. As such curing agents there may be used basic or primarily acidic compounds; there are suitable, for example, amines or amides such as aliphatic or aromatic primary, secondary or tertiary amines, for example mono-, di- and tributylamines, para-phenylenediamine, ethylenediamine, N:N-diethyl-ethylenediamine, diethylenetriamine, triethylenetetramine, tetraethylenepentamine, trimethylamine, diethylamine, triethanolamine, Mannich's bases, piperidine, piperazine, guanidine and guanidine derivatives such as phenyldiguanidine, diphenylguanidine, dicyandiamide, formaldehyde resins with aniline, urea or melamine; polymers of aminostyrenes; polyamides, for example those from aliphatic polyamines and dimerized or trimerized unsaturated fatty acids; isocyanates, isothiocyanates; polyhydric phenols, for example resorcinol, hydroquinone, quinone, phenolaldehyde resins, oil-modified phenolaldehyde resins; reaction products of aluminum alcoholates or phenolates with compounds of tautomeric reaction of the type of acetoacetic acid, Friedel-Crafts catalysts, for example aluminum trichloride, antimony pentachloride, tin tetrachloride, zinc chloride or boron trifluoride or their complexes with organic compounds; boroxines such as trimethoxyboroxine; metal fluoborates such as zinc fluoborate; phosphoric acid; salts of acid reaction such as, for example, zinc nitrite, diammonium phosphate or ammonium silicofluoride; polybasic carboxylic acids and anhydrides thereof, for example phthalic anhydride, methyl - endomethylene - tetrahydrophthalic anhydride, hexahydrophthalic anhydride, dodecenylsuccinic anhydride, hexachloro - endomethylene - tetrahydrophthalic anhydride or mixtures of said anhydrides; maleic or succinic anhydride, if desired in conjunction with an accelerator, such as a tertiary amine.

The term "curing" as used in this context refers to the conversion of any one of the aforementioned, substantially linear telomers containing epoxide groups into cross-linked insoluble and infusible resins.

The homotelomerizates and cotelomerizates obtained by the present process can be used for a wide variety of purposes. They are liquid or solid, fusible substances that can be used for all purposes in which curable condensation resins and/or polymerization resins are generally employed. They can be used by themselves or in admixture with curing agents; also in combination with other curable condensation resins such, for example, as aminoplasts, phenoplasts, epoxy resins, polyacetals from polyalcohols and aldehydes, and similar products, either without or with fillers, and in solution or emulsion, as textile assistants or textile dressings, as binders for pigment dyeings and prints on textile materials, more especially those of synthetic fibers, for examples polyamide, polyester or polyacrylonitrile fibers; lacquers, varnishes, paints, dipping or casting resins, coating compositions, pore fillers and putties, adhesives and the like, and also for the manufacture of such products. Telomerizates prepared from chlorine-containing or phosphorus-containing telogens are in general distinguished by their outstanding inflammability. The telomers containing epoxide groups are also excellently suitable as lacquer raw materials in combination with methylolated acrylamide copolymers. Such combination lacquers with epoxy resins of the invention produce lacquer films that adhere better and are more elastic than the known combination lacquers based on methylolated acrylamide copolymers and the known epoxy resins obtained by condensing epichlorohydrin with a polyhydric phenol, such as Bisphenol A.

Parts and percentages in the following examples are by weight. The relationship between parts by weight and parts by volume is the same as that between the kilogram and the liter.

*Example 1*

A mixture of 400 parts of carbon tetrachloride, 200 parts of allylglycidyl ether and 1 part of benzoyl peroxide is refluxed for 20 hours at an internal temperature of 87° C. During this operation another 3 parts of benzoyl peroxide are added at regular intervals in portions of 0.5 part each. The unreacted carbon tetrachloride and allylglycidyl ether are then distilled off. Finally, there are left 96 parts of a colorless, thinly liquid product which contains 5.08 epoxide equivalents per kg. and 30.8% of chlorine, and consists preponderantly of telomers of the formula

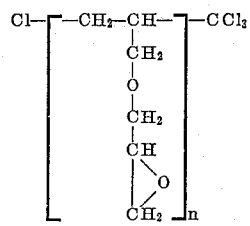

This product can be cured in the cold with amines such as triethylenetetramine. When 10% of trixylenyl phosphate are added, the cured resin is flameproof. When the telomer is boiled for ½ hour with methanolic sodium hydroxide solution, it loses 13% of its chlorine content.

*Example 2*

A mixture of 50 parts of allylglycidyl formal, 100 parts of carbon tetrachloride and 1 part of benzoyl peroxide is heated for 24 hours at the boil. The internal temperature of the reaction solution is about 89° C. Another addition of 1 part of benzoyl peroxide each is made after 8 and 16 hours. The mixture is then allowed to cool and distilled. At first carbon tetrachloride passes over and then, at 37° C. under a pressure of 0.2 mm. Hg, 10 parts of unreacted formal distil. Finally, there are left 62 parts of a colorless liquid of low viscosity which contains 3.82 epoxide equivalents per kg., and 31.7% of chlorine. It consists predominantly of telomers of the formula $$CCl_3-\left[-CH-CH_2-\phantom{XXXXXXXX}\overset{O}{\overset{\diagup\diagdown}{\phantom{X}}}\phantom{X}\right]-Cl$$
$$\phantom{CCl_3-[}CH_2-OCH_2-OCH_2-CH-CH_2\phantom{]_n}$$

in which $n$ is an average value of about 2. This product can be cured with triethylene tetramine or trimethoxyboroxine to form a bright, infusible resin. When the curing is carried out with 10% of trixylenyl phosphate, the cured resin is flameproof.

*Example 3*

A mixture of 65 parts of ortho-allyl-phenyl-glycidyl ether (containing 4.3 epoxide equivalents per kg.), 115 parts of carbon tetrachloride and 1 part of benzoyl peroxide is heated for 20 hours at the boil. An addition of 0.5 part of benzoyl peroxide each is made after 5, 10 and 15 hours. During the whole reaction the internal temperature is about 88° C. The excess carbon tetrachloride is distilled off and then, at 86–90° C. under a pressure of 0.15 mm. Hg, 48 parts of unreacted allyl-phenyl-glycidyl ether are removed. There are left 18 parts of a yellow liquid of low viscosity which contains 2.55 epoxide equivalents per kg. and 23.45% of chloride; it consists predominantly of telomers of the formula $$CCl_3-\left[-CH-CH_2-\phantom{XXXXXXXXX}\right]-Cl$$

in which $n$ is an average value of about 2.4.

This product can be cured with amines such as triethylene-tetramine, acid anhydrides such as phthalic anhydride or with boroxines, such as trimethoxyboroxine.

*Example 4*

A mixture of 71 parts of allyl-3-chloro-2-hydroxy-1-propyl ether, 155 parts of carbon tetrachloride and 0.5 part of benzoyl peroxide is refluxed at the boil for 20 hours. An addition of 0.5 part of benzoyl peroxide each is then made after 5, 10 and 15 hours. The excess carbon tetrachloride and 26 parts of unreacted chlorohydrin are then distilled off at 44° C., under a pressure of 0.2 mm. Hg, to leave behind 46 parts of a viscous residue containing 38.5% of chlorine. The product consists predominantly of telomers of the formula

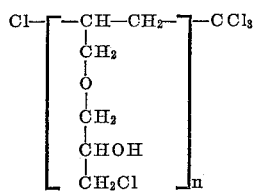

in which $n$ is an average value of about 2. The resulting telomeric chlorohydrin ether is converted into the corresponding telomeric glycidyl ether (having a constitution analogous to that described in Example 1) in the following manner:

41 parts of the telomer described above are vigorously stirred for 1½ hours at 55° C. with 34 parts of sodium hydroxide solution of 30% strength. 70 cc. of benzene are then added and the aqueous layer is separated and concentrated, to yield 27 parts of a yellow liquid which contains 3.25 epoxide equivalents per kg. and 32.1% of chlorine.

*Example 5*

A mixture of 100 parts of diallyl phthalate, 154 parts of carbon tetrachloride and 1 part of benzoyl peroxide is refluxed at the boil for 24 hours. An addition of 0.5 part of benzoyl peroxide each is then made after 5, 10 and 15 hours, whereupon the excess carbon tetrachloride is distilled off. The degree of conversion of diallyl phthalate is quantitative. The colorless residue solidifies in the cold and contains 21.7% of chlorine, which is almost exactly equal to 2 mols of diallyl phthalate per mol of carbon tetrachloride. Accordingly, the product consists predominantly of telomers of the formula

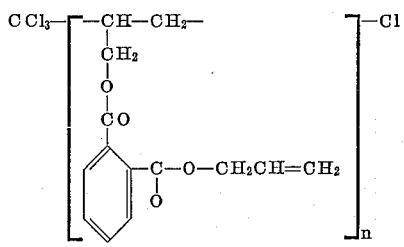

in which $n$ is an average value of about 2.

This telomer is epoxidized as follows:

26 parts of succinic anhydride and 200 parts of the telomer described above are dissolved at 55° C. in 250 parts by volume of ethyl acetate. During the whole duration of the reaction the reaction vessel is kept immersed in a bath maintained at 65 to 70° C. 4.25 parts of finely ground anhydrous sodium carbonate and 30 parts by volume of ethyl acetate are then stirred in.

In the course of 10 minutes 10.4 parts of hydrogen peroxide of 85% strength are then stirred in dropwise. The mixture is stirred for 21 hours at the above-mentioned temperature, during which succinic acid precipitates, then diluted with 100 parts by volume of ethyl acetate and cooled to 20° C. The succinic acid is filtered off and washed 3 or 4 times with a small amount of ethyl acetate. Overnight, the filtrate is neutralized by being stirred with 50 parts of sodium carbonate and then filtered. The solvent is completely distilled off under vacuum to leave as residue 145 parts of a foamy mass which is easy to comminute, has a melting point of 55–62° C. and contains 0.69 (theoretical content 0.985) epoxide equivalent per kg.

*Example 6*

A mixture of 114 parts of allyl-glycidyl ether, 110 parts of dimethyl phosphite and 1 part of benzoyl peroxide is heated for 20 hours at 100° C. Additions of 0.5 part of benzoyl peroxide each are made after 5, 10 and 15 hours. The reaction mixture is then cooled and 190 parts of a mixture are distilled off which consists of unreacted ether and unreacted phosphite, to leave behind 37 parts of a colorless liquid which contains 4.7 epoxide equivalents per kg. and consists predominantly of telomers of the formula

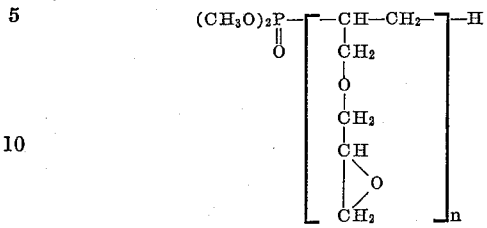

This product can be cured to form a flameproof resin with the aid of amines such as triethylenetetramine, or of a polycarboxylic acid anhydride such as phthalic anhydride.

*Example 7*

A mixture of 114 parts of allyl-glycidyl ether, 98 parts of cyclohexanone and 1 part of hydrogen peroxide is heated for 18 hours at 30° C. Additions of 0.5 part of hydrogen peroxide each are made after 5, 10 and 15 hours. The unreacted starting materials are distilled off, to leave behind 53 parts of a yellow liquid which contains 4.9 epoxide equivalents per kg. and consists predominantly of telomers of the formula

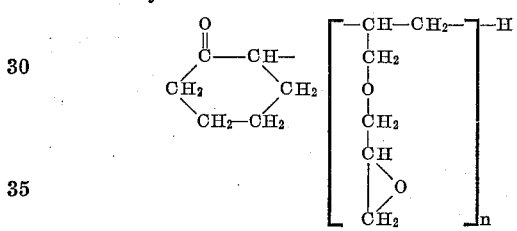

This product can be cured with amines such as triethylenetetramine, with a polycarboxylic acid anhydride such as phthalic anhydride, or with a boroxine.

*Example 8*

A mixture of 100 parts of the monoepoxide of diallyl phthalate and 47 parts of dimethyl phosphite is heated to 100° C. Another 0.5 part of benzoyl peroxide is then added, and at intervals of 3 hours six further additions of 0.3 part of benzoyl peroxide each are made. After 22 hours the experiment is discontinued, and the unreacted starting materials are distilled off in a high vacuum, to leave behind 109 parts of a telomer in the form of a bright-yellow, viscous liquid which contains 2.98 epoxide equivalents per kg. and 2.28% of phosphorus; it consists predominantly of telomers of the formula

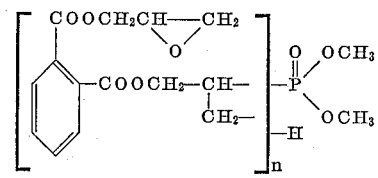

*Example 9*

A mixture of 223 parts of allylphenyl-glycidyl ether and 116 parts of cyclohexanone is heated to 105° C., whereupon 1 part of hydrogen peroxide of 85% strength is added. 7 further additions of 0.4 part each of this peroxide are made at intervals of 2 hours. After 22 hours the experiment is discontinued, and the unreacted substances are distilled off, to leave behind 72 parts of a viscous liquid which contains 2.49 epoxide equivalents per kg.

*Example 10*

A mixture of 114 parts of allylglycidyl ether and 160 parts of diethyl phosphite is heated to 95° C., and 1 part of azo-bis-isobutyronitrile is then added. 10 more additions of 0.3 part each of this nitrile are made at intervals of 2 hours. After 24 hours the experiment is dicontinued and the unreacted starting materials are distilled off, to leave behind 67 parts of a yellow liquid which contains 4.23 epoxide equivalents per kg. and 8.15% of phosphorus, and which consists predominantly of telomers of the formula

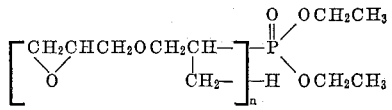

The starting products removed by distillation can be used for a further batch; this fraction has the identical composition even after having been used in several batches.

When, instead of a total of 4 parts of azo-bis-isobutyronitrile, a total of 4 parts of benzoyl peroxide of 85% strength is used as catalyst, there are obtained 61 parts of the telomer containing 4.55 epoxide equivalents per kg.

Example 11

A mixture of 228 parts of allyl-glycidyl ether, 539 parts of dimethyl phosphite and 398 parts of ethylene tetrachloride is heated to 95° C., whereupon 2 parts of benzoyl peroxide are added. Another 10 additions of 0.5 part each of benzoyl peroxide are then made at intervals of 2 hours. The unreacted starting materials are then distilled off, to leave behind 300 parts of a yellow, viscous liquid which contains 3.67 epoxide equivalents per kg., 7.9% of chlorine and 9.6% of phosphorus. On treatment with an amine, such as triethylene-tetraamine, this cotelomer forms flameproof resins.

Example 12

Epoxy resin mixtures consisting of 30 parts (test 1) and respectively 50 parts (test 2) and 70 parts (test 3) of a telomer prepared as described in Example 7 (Resin A) containing 4.9 epoxide equivalents per kg. and having a viscosity of 620 centipoises at 25° C., and 70 parts (test 1) and respectively 50 parts (test 2) and 30 parts (test 3) of a mixture (which is liquid at room temperature and has a viscosity of 1760 centipoises at 25° C.) of 1 part of dibutyl phthalate and 5 parts of a polyglycidyl ether resin (Resin B) (containing 4.5 epoxide equivalents per kg.) prepared by reacting epichlorohydrin with bis-(4-hydroxyphenyl)-dimethylmethane in the presence of an alkali, are stirred with dimethyl-aminopropylamine as curing agent, using ⅙ molecular proportion of curing agent for every epoxide equivalent. The resulting casting resin mixtures are cast at about 40° C. in aluminum moulds (40 x 10 x 140 mm.) and cured for 24 hours at 40° C. The properties of the casting made from batches 1, 2 and 3 are shown in the following table:

| Test | Resin A | Resin B | Bending strength in kg./sq. mm. | Impact bending strength in cm. kg./sq. cm. | Shape stability at elevated temperatures acc dg. to Martens (DIN) in ° C. |
|---|---|---|---|---|---|
| 1 | 30 | 70 | 10.5 | >16.5 | 56 |
| 2 | 50 | 50 | 8.0 | 10.0 | 54 |
| 3 | 70 | 30 | 7.3 | 13.2 | 50 |

Example 13

5 parts of a telomer prepared as described in Example 7 (Resin A) (containing 4.9 epoxide equivalents per kg.) and 95 parts of a polyglycidyl ether which is liquid at room temperature (Resin C) [containing 5.5 epoxide equivalents per kg.; prepared by reacting epichlorohydrin with bis-(4-hydroxyphenyl)-dimethylmethane in the presence of an alkali] are stirred at 60° C. with 4:4'-diaminodiphenylmethane as curing agent, using 0.25 molecular proportion of curing agent for every epoxide equivalent. The mixture of the resin and the curing agent is cast in aluminum moulds (40 x 10 x 140 mm.) and cured for 3 hours at 60° C. and then for 4 hours at 80° C. The properties of the resulting castings are shown in the following table:

| | |
|---|---|
| Resin A | 5 |
| Resin C | 95 |
| Pot life at 60° C. up to 3000 centipoises in minutes | 89 |
| Bending strength, kg./sq. mm. | 13.6 |
| Impact bending strength, cm. kg./sq. cm. | 23.6 |
| Shape stability at elevated temperatures according to Martens (DIN) in ° C. | 119 |

Example 14

64 parts of a telomer prepared as described in Example 7 (containing 4.9 epoxide equivalents per kg.) are dissolved at 120° C. in 41 parts of phthalic anhydride and cast in aluminum moulds (40 x 10 x 140 mm.). This mixture of the resin and the curing agent is used for cementing together degreased and ground strips of sheet aluminum (marketed under the tradename Anticorodal B; 170 x 25 x 1.5 mm.; 10 mm. overlap). The castings and the cemented strips are cured for 4 hours at 120° C. and then for 24 hours at 140° C. The cured casting has a bending strength of 13.0 kg./sq. mm. and an impact bending strength of 6.1 cm. kg./sq. cm., and the cemented bond has a tensile shear strength of 1.67 kg./sq. mm.

Example 15

In a first test 35 parts of a telomer (Resin D) as described in Example 6 (containing 4.7 epoxide equivalents per kg.; viscosity 200 centipoises at 25° C.) are mixed with 65 parts of a polyglycidyl ether resin which is liquid at room temperature (Resin F) (containing 5.4 epoxide equivalents per kg.; viscosity: 10,000 centipoises at 25° C.) prepared by reacting epichlorohydrin with bis-(4-hydroxyphenyl)-dimethylmethane in alkali.

In a second test 35 parts of a telomer (Resin E) prepared as described in Example 10 (containing 4.23 epoxide equivalents per kg.; viscosity: 150 centipoises at 25° C.) are mixed with 65 parts of the polyglycidyl ether resin F, and In a third test 35 parts of trixylenyl phosphate are mixed with 65 parts of the polyglycidyl ether resin F.

The three batches are stirred with dimethylaminopropylamine as curing agent, using in each case ⅙ molecular proportion of curing agent for every epoxide equivalent, and cast at about 40° C. in aluminum moulds (40 x 10 x 140 mm.). The castings are first gelatinized at room temperature and then cured for 24 hours at 40° C. The properties of the resulting castings are shown in the following table:

| Test | Resin D | Resin E | Resin F | Trixylenyl phosphate | Viscosity of resin mixture at 25° C. in centipoises | Bending strength in kg./sq. mm. | Impact bending strength in cm. kg./sq. cm. | Shape stability at elevated temperatures according to Martens (DIN) in ° C. | Flammability (VDE) | |
|---|---|---|---|---|---|---|---|---|---|---|
| | | | | | | | | | Stage | Flammable for seconds |
| 1 | 35 | | 65 | | 1,975 | 12.8 | 11.0 | 63 | 1 | 3 |
| 2 | | 35 | 65 | | 1,890 | 11.6 | >23.5 | 62 | 1 | 1 |
| 3 | | | 65 | 35 | 2,300 | (1) | (1) | (1) | (1) | (1) |

¹ Brittle, not workable.

Example 16

A mixture of 1.7 parts of a telomer prepared as described in Example 6 (containing 4.7 epoxide equivalents per kg.), 1.7 parts of the chlorine-containing epoxy resin described below (containing 3.55 epoxide equivalents per kg.) and 8.0 parts of a polyglycidyl ether resin (which is liquid at room temperature and contains 5.4 epoxide equivalents per kg.) are stirred with 8.6 parts of methyl-Nadic-anhydride. Degreased and ground strips of aluminum (marketed under the tradename Anticorodal B; 170 x 25 x 1.5 mm.; overlap 10 mm.) are cemented together with the mixture prepared as described above. The strips are cemented at different temperatures, and the bonds have the shear strength properties shown in the following table:

| Cured for— | Shear strength |
|---|---|
| 24 hours at 160° C. | 2.70 |
| 8 hours at 180° C. | 2.62 |
| 24 hours at 180° C. | 2.78 |
| 24 hours at 200° C. | 2.45 |

The chlorine-containing epoxy resin used in the above tests is prepared in the following manner:

A mixture of 97 parts of the diglycidyl ether of 1:1-bis-(hydroxymethyl)-cyclohexene-3 and 156 parts (corresponding to a molecular excess of 50%) of hexachlorocyclopentadiene is heated for 15 hours at 140° C.

88 parts of excess hexachlorocyclopentadiene are then expelled under a vacuum of 0.1 mm. Hg and there is obtained a residue of 161 parts of a bright-brown liquid which contains 3.3 epoxide equivalents per kg. and consists predominantly of the adduct of the formula

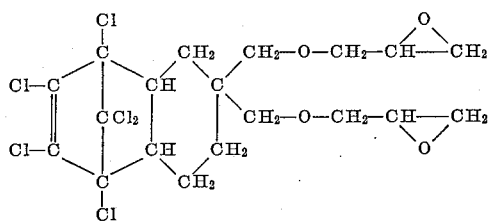

Example 17

A mixture of 189 parts of the solution (see below) of a methylolated acrylamide copolymer, 15 parts of the telomer of allyl-glycidyl phthalate and dimethyl phosphite described in Example 8, and 0.6 part of ortho-phosphoric acid of about 85% strength is diluted with a mixture of lacquer solvents consisting of equal parts of diacetone alcohol, butyl acetate, methylethylketone and ethylene glycol monoethyl ether to form a spraying varnish containing 35% of resin. When this varnish is applied to sheet aluminum and cured for 30 minutes at 150° C., it forms a colorless, flexible, excellently adhering film which, in a layer 0.016 mm. thick, has a deep-drawing value according to Erichsen of 8.4 mm.

When in the above example the telomer (the cross-linking agent) is omitted, the acrylate by itself, after having been cured for 30 minutes at 150° C., reveals a deep-drawing value according to Erichsen of 7.5 mm.

The solution of the methylolated acrylamide copolymer used above is prepared in the following manner:

A mixture of 270 parts of styrene, 240 parts of butyl acrylate, 90 parts of acrylamide, 8 parts of cumene hydroperoxide, 4 parts of dodecylmercaptan and 600 parts of butanol is stirred under reflux for several hours, until over 96% of the monomers has been converted into polymers. The polymer so formed is then refluxed for 3 hours with 192 parts of a formaldehyde solution of 40% strength in butanol and 3 parts of maleic anhydride. About 300 parts of butanol are distilled off and the resinous residue is diluted with xylene to a solids content of about 45%.

This viscosity of the resulting resin solution is about 1100 centipoises as 25° C. and it has a color number (Gardner 1953) of 1.

Example 18

12 parts of the telomer of allylphenyl-glycidyl ether and cyclohexanone (described in Example 9) are mixed with 151 parts of the solution of a methylolated acrylamide copolymer used in Example 17 and the mixture is diluted with the lacquer solvent mixture of Example 17 to form a spraying varnish having a solids content of 26%.

The varnish is applied to sheet aluminum and stoved for 30 minutes at 180° C., to leave a colorless film which adheres excellently to the aluminum. In a layer about 0.020 mm. thick it displays a deep-drawing value according to Erichsen of 8.5 mm.

When is the above example the telomer is replaced by a commercial epoxy resin which is solid at room temperature—such as is obtained by condensing bis-(4-hydroxyphenyl)-dimethyl-methane with epichlorohydrin in the presence of an alkali, which contains 2.0 epoxide equivalents per kg.—an Erichsen value of 7.5 mm. is achieved.

What is claimed is:

1. Telomers of the formula

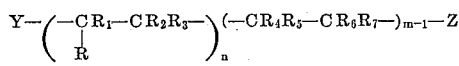

where Y and Z represent the atoms and radicals formed by the scission of a telogen YZ, where Y is a member selected from the group consisting of hydrogen and chlorine, and Z is a member selected from the group consisting of halogenated hydrocarbons, dialkyl phosphites and cyclohexanone, from which the radical Y has been split off; $R_1$ to $R_7$ each represents a member selected from the class consisting of hydrogen, halogen atom and lower hydrocarbon radical, R represents an organic radical selected from the group consisting of

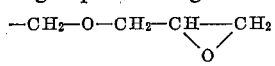

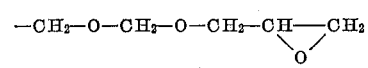

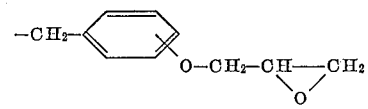

and

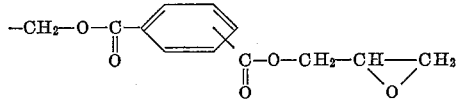

and n and m are small whole numbers, the sum $$[n+(m-1)]$$

is at least 1 and at most 20, and in which the individual structural units

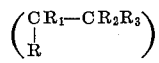

and $(CR_4R_5-CR_6R_7)$ occure in the telomer chain in any possible sequence.

2. Telomers as claimed in claim 1, whose terminal groups Y and Z have been formed by splitting a saturated halogenated hydrocarbon.

3. Telomers as claimed in claim 1, whose terminal groups Y and Z have ben formed by splitting a dialkyl phosphite.

4. Telomers as claimed in claim 1, whose terminal groups Y and Z have been formed by splitting cyclohexanone.

5. Telomers as claimed in claim 1 containing structural units of the formula

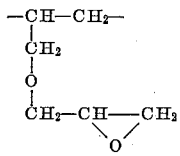

6. Telomers as claimed in claim 1, containing structural units of the formula

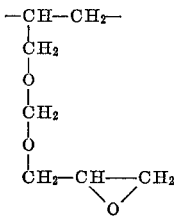

7. Telomers as claimed in claim 1, containing structural units of the formula

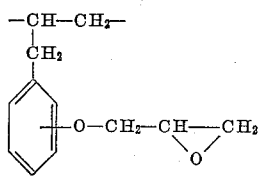

References Cited by the Examiner
UNITED STATES PATENTS

| | | | |
|---|---|---|---|
| 2,402,137 | 6/1946 | Hanford et al. | 260—94 |
| 2,720,530 | 10/1955 | Patrick | 260—348 |
| 2,723,971 | 11/1955 | Cupery | 260—2 |
| 2,868,837 | 1/1959 | Burland et al. | 260—561 |
| 2,949,474 | 8/1960 | Murdoch et al. | 260—88.3 |
| 2,983,703 | 5/1961 | D'Alelio | 260—47 |

OTHER REFERENCES

Schildknecht, Polymer Processes, Interscience Publishers, Inc., N.Y., 1956, pages 147–9, 177–81.

WILLIAM H. SHORT, *Primary Examiner.*

HAROLD N. BURSTEIN, *Examiner.*

P. H. HELLER, S. N. RICE, J. C. MARTIN,
*Assistant Examiners.*